July 3, 1962 J. A. POMMERSHEIM 3,042,064
GAS PRESSURE REGULATOR
Filed April 2, 1957 3 Sheets-Sheet 1
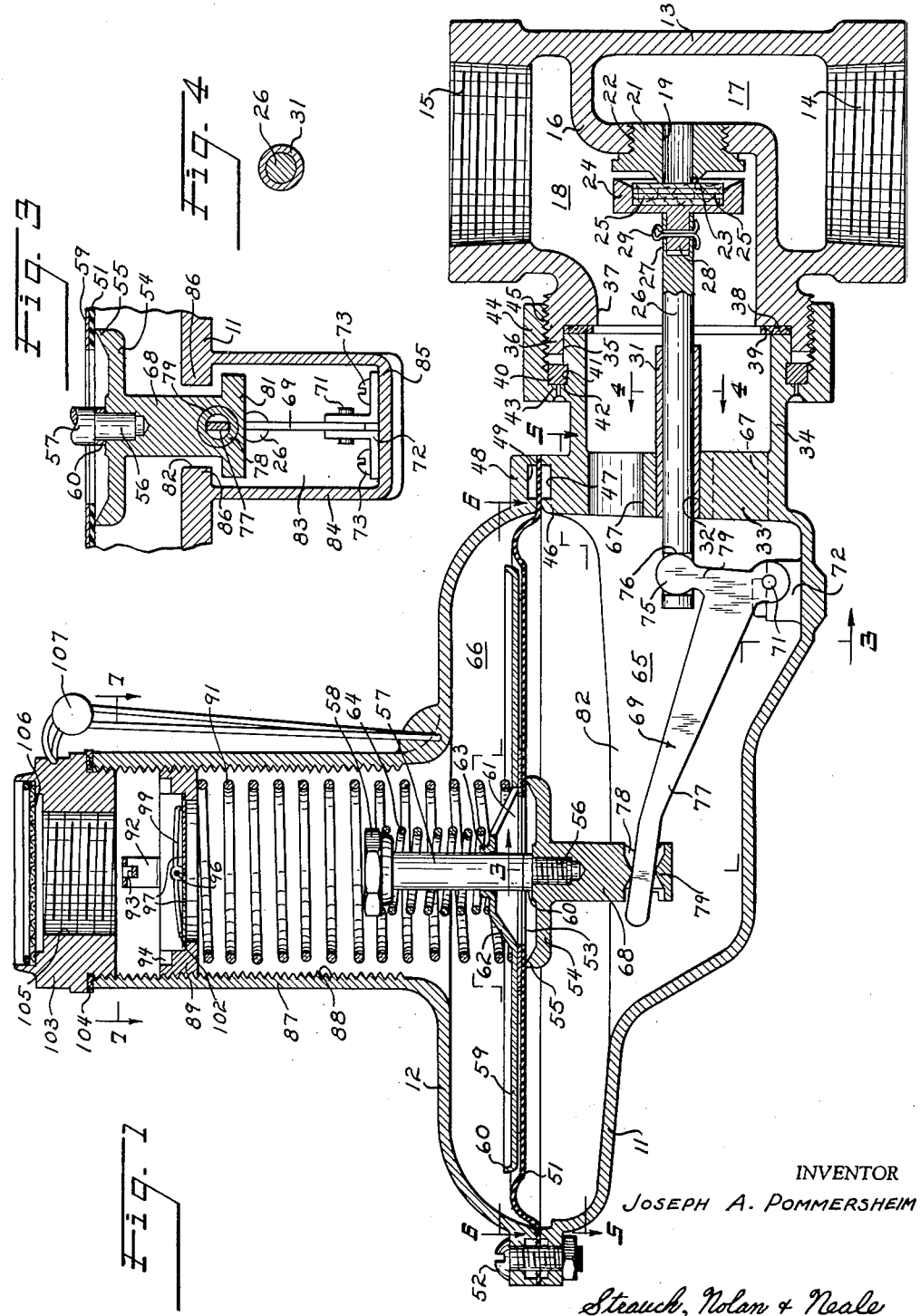
INVENTOR
JOSEPH A. POMMERSHEIM
Strauch, Nolan & Neale
ATTORNEYS

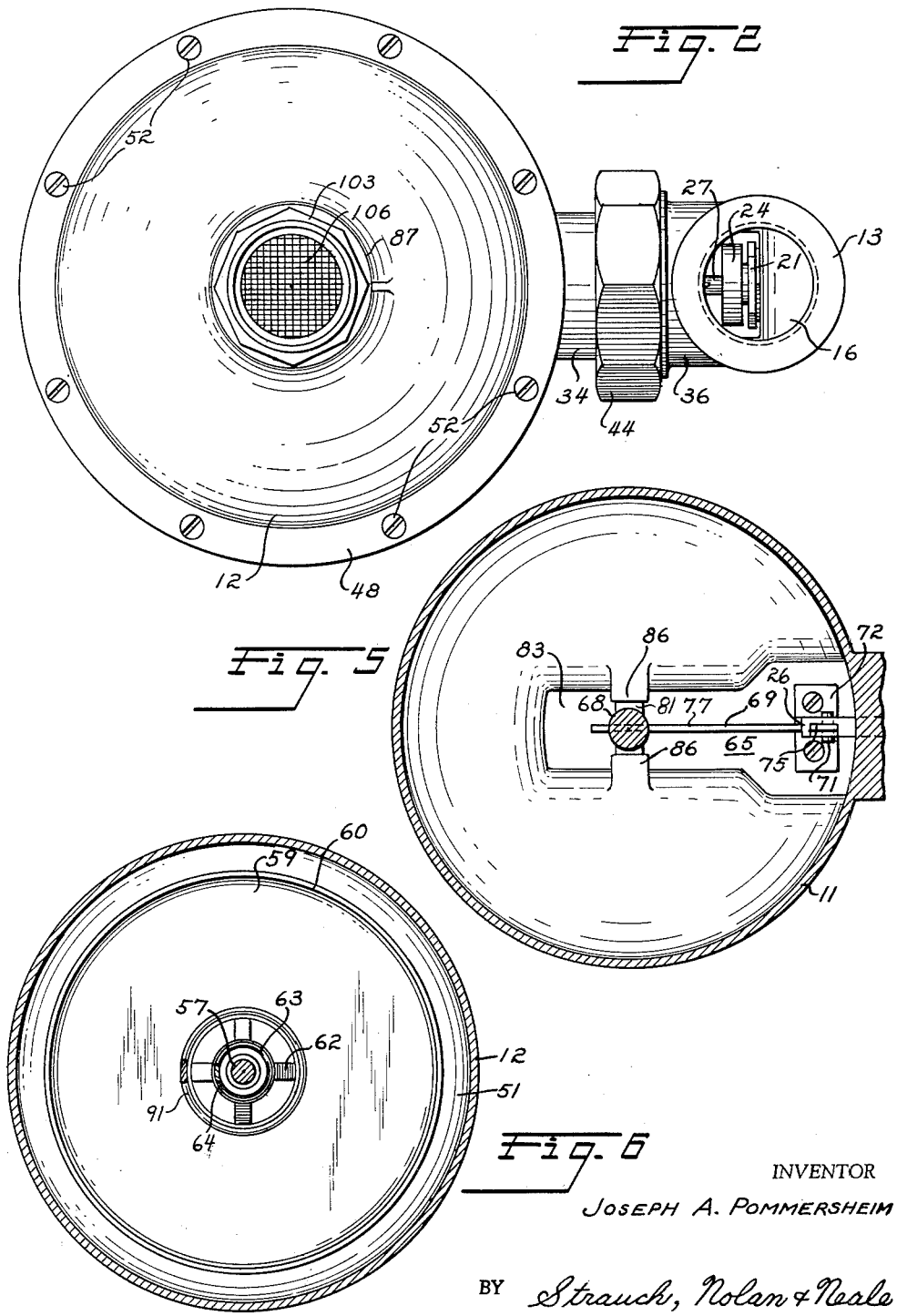

July 3, 1962 J. A. POMMERSHEIM 3,042,064
GAS PRESSURE REGULATOR
Filed April 2, 1957 3 Sheets-Sheet 3
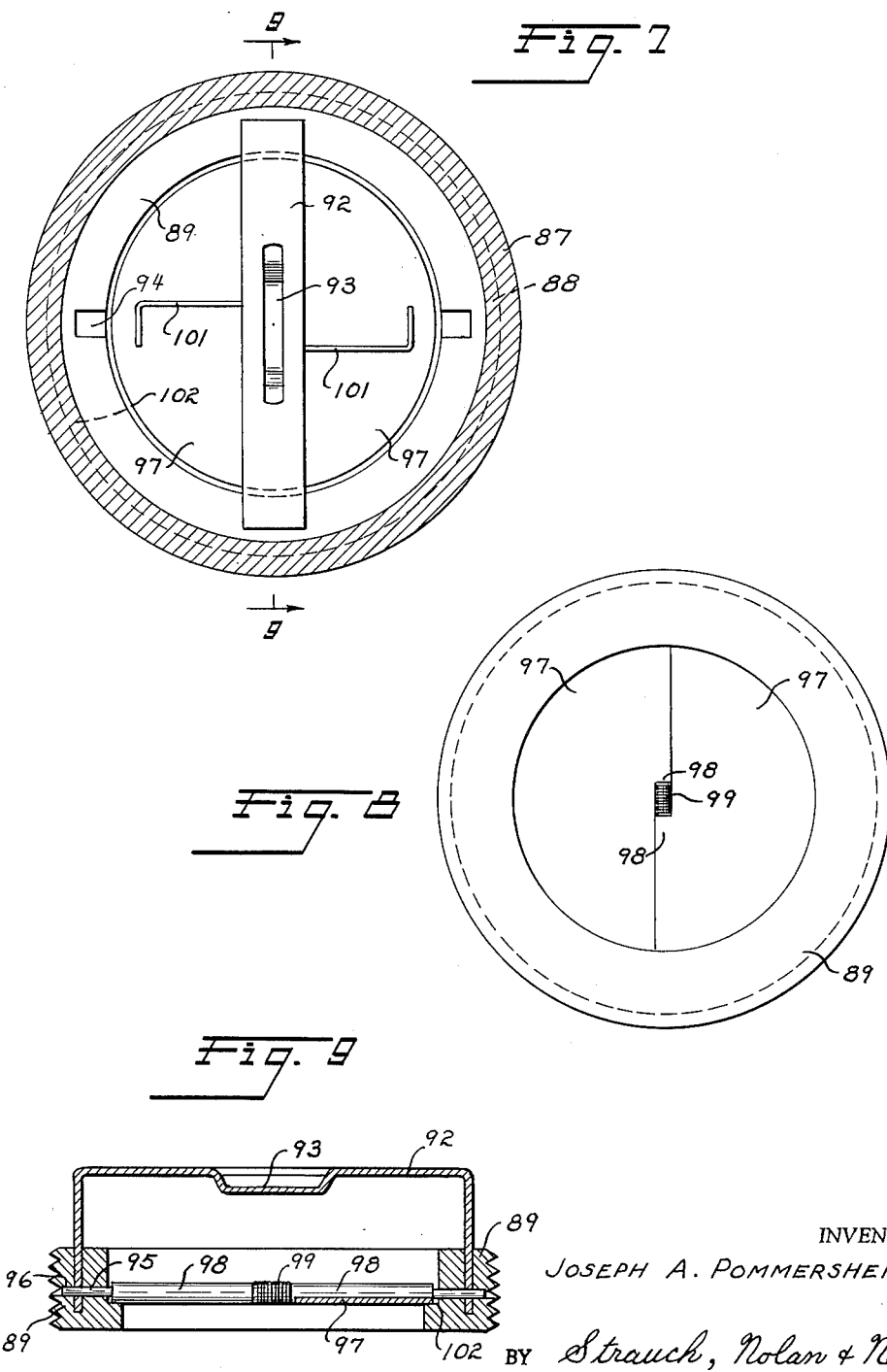
INVENTOR
JOSEPH A. POMMERSHEIM
BY Strauch, Nolan & Neale
ATTORNEYS United States Patent Office 3,042,064
Patented July 3, 1962

3,042,064
GAS PRESSURE REGULATOR
Joseph A. Pommersheim, Norwalk, Ohio, assignor to Rockwell Manufacturing Company, Pittsburgh, Pa., a corporation of Pennsylvania
Filed Apr. 2, 1957, Ser. No. 650,144
11 Claims. (Cl. 137—116.5)

This invention relates to gas pressure regulators and is particularly concerned with improvements in regulator structure and operation especially in the diaphragm operated linkage to the main valve, the provision of a special internal relief valve arrangement to protect the diaphragm, and a special venting arrangement.

It is a major object of this invention to provide a gas pressure regulator having a novel motion transmitting connection between the pressure responsive element and the main valve.

A further object of the invention is to provide a gas pressure regulator having a novel internal relief valve.

Another object of the invention is to provide a gas pressure regulator wherein the main valve and relief valve stems are connected by a novel motion transmitting linkage disposed in a well in the regulator body.

It is a further object of the invention to provide a novel gas pressure regulator having coaxially and centrally arranged relief and vent valves.

It is a further object of the invention to provide a novel safety stop for opening the relief valve when the actuating linkage between the pressure responsive element and the main valve is broken in a gas pressure regulator.

A further object of the invention is to provide a novel gas pressure regulator wherein the diaphragm loading spring adjustment member carries a venting valve assembly.

A further object of the invention is to provide a gas pressure regulator having an internal relief valve wherein a novel association of relief valve stem and body stops is provided.

A further object of the invention is to provide a novel combined diaphragm loading spring adjustment and vent valve assembly.

FIGURE 1 is a sectional side elevation through a gas pressure regulator embodying the features of the invention;

FIGURE 2 is a top plan view of the regulator;

FIGURE 3 is a fragmentary section on line 3—3 of FIGURE 1 particularly showing the mounting of the lower end of the relief valve stem within the body bottom well;

FIGURE 4 is a fragmentary section on line 4—4 of FIGURE 1 showing the guide sleeve for the main valve stem;

FIGURE 5 is a section on line 5—5 of FIGURE 1 showing the well at the bottom of the body and the main valve linkage;

FIGURE 6 is a section on line 6—6 of FIGURE 1 showing the relief valve opening structure above the diaphragm;

FIGURE 7 is a section on line 7—7 of FIGURE 1 showing the adjustable spring retainer and vent valve;

FIGURE 8 is a bottom view of the combined spring retainer and vent valve; and

FIGURE 9 is a section on line 9—9 of FIGURE 7 showing details of construction.

The gas pressure regulator comprises a lower complex body casting 11, an upper body casting 12, and a main valve housing 13 connected to the body. The valve housing 13 is essentially an inserted part of a pipe line through which flows the gas whose pressure is to be controlled. Housing 13 has an inlet opening 14 threaded to connect into the pipe line and a coaxial threaded outlet opening 15 adapted to be connected into the pipe line. The body castings are preferably aluminum for lightweight with rigidity.

An internal wall 16 separates the interior of housing 13 into an inlet pressure chamber 17 and an outlet pressure chamber 18, and wall 16 contains a valve orifice of accurately predetermined size consisting of a smooth cylindrical axial bore 19 in a removable and renewable valve seat plug 21 threaded into a threaded aperture 22 in the wall.

Within the outlet chamber 18, the valve bore 19 terminates in an annular seat 23. FIGURE 1 shows the valve in closed position. The valve comprises a head 24 which is recessed to contain a compressible valve seat engaging material 25 adapted to sealingly engage the seat 23. The main valve stem 26 is cylindrical with a recessed end portion 27 to telescopingly receive the projecting integral pin 28 on the head 24, and a cotter pin or the like 29 removably secures the head 24 to stem 26.

Stem 26 is mounted in a slide guide bearing provided by an elongated sleeve 31 of brass or the like that is press fitted into an aperture 32 in an internal integral wall 33 of lower body casting 11. Casting 11 is formed outwardly of wall 33 with a tubular coupling boss 34 that telescopes snugly into an enlarged bore 35 formed at the end of a tubular valve housing portion 36 surrounding the lateral valve housing opening 37 and providing a flat axially facing shoulder 38 against which coupling boss 34 abuts with a compressible seal gasket 39 therebetween. A split spring retainer ring 40 of rectangular cross-section is mounted in an annular groove 41 on boss 34 so that its end face 42 serves as an abutment to be engaged by an inturned end flange 43 of a nut 44 rotatable on the external threads 45 of housing portion 36. Thus by rotating nut 44 valve housing 13 is drawn into rigid fluid tight mounting with the regulator body so that the body is supported by the pipe line. The regulator body may be rotated to any angular rotation on the housing 13 simply by loosening nut 44 slightly to permit such rotation and then drawing the nut tight when the desired position is attained.

The bores of sleeve 31 and bore 19 are coaxial, but the cotter pin mounting of the head 24 on the stem 26 is such as to permit any slight self alignment of the head as may be needed to obtain an adequately tight seat on the valve seat so that the tolerances may not be critical.

Above wall 33 the lower body casting is formed with a circular rim 46 having a continuous surface groove 47. The upper body casting is formed with a matching circular rim 48 having a continuous surface groove 49. A flexible diaphragm 51 has its outer periphery clamped between rims 46 and 48, and a series of bolt and nut assemblies 52 pass through both rims and the diaphragm to tightly and rigidly secure the body castings together. Since diaphragm 51 is made of a synthetic rubber such as neoprene it forms a fluid tight peripheral seal around the rims 46 and 48.

Diaphragm 51 is annular, being formed with a central circular opening 53, and a relief valve member 54 is formed with a sharp edged peripheral seat 55 adapted to engage the lower surface of diaphragm 51 around opening 53. Valve member 54 is centrally formed with a threaded bore 56 for mounting a post 57 that projects up through the center of opening 53 and terminates in an enlarged bolt-like head 58 above the diaphragm.

An annular sheet metal pan 59 having a smoothly upturned outer edge flange 60 overlies most of the upper surface of diaphragm 51 outwardly of opening 53. Pan 56 has an inner opening 61 corresponding to diaphragm opening 53, and inclined spokes 62 (FIGURE 6) rise thereabove to terminate in an integral collar 63 slidably surrounding and guiding the smooth cylindrical surface of post 57. A coiled compression spring 64 surrounds post 57 and is compressed between post head 58 and pan collar 63, and this spring 64 thereby tends to clamp the inner edge of diaphragm 51 between the inner edge of pan 59 and relief valve seat 55, so that under normal conditions the diaphragm aperture 53 will be effectively closed and the outlet pressure chamber 65 in the lower body casting will not be in fluid communication with the upper body chamber 66. Wall 33 is apertured at 67 to insure that chamber 65 will be at outlet line pressure.

The relief valve stem 68 is connected to main valve stem 26 by a bell crank 69 which is a flat lever (FIGURES 3 and 5) pivoted upon a pin 71 mounted in a bifurcated bracket 72 that may be integral as shown in FIGURE 1 or separably secured to the body as by machine screws 73 in FIGURE 3.

The outer arm 74 of the bell crank has a rounded end 75 that fits pivotally within a side slot 76 in main valve stem 26 inwardly of wall 33. The inner arm 77 of the bell crank is longer and projects loosely slidably through a circular transverse opening 78 formed in relief valve stem 68. Opening 78 comprises end apertures of general conical form tapering inwardly to intersect in a central annular knife edge bearing 79 on which the flat crank arm rocks during main valve control operation.

As shown best in FIGURES 1 and 3 the lower end of relief valve stem 68 is enlarged at 81 below where it extends through a slot 82 in the bottom of casting 11 into an integral well 83 having side walls 84 and a bottom wall 85 from which bracket 72 uprises. In appearance well 83 is a hollow rib on the bottom of body casting 11, and the motion transmitting linkage between the relief valve and main valve stems is disposed within this well.

As shown in FIGURES 3 and 5, the top entrance to well 83 is formed with opposed stop lugs 86 extending thereover and adapted to arrest upward displacement of the relief valve stem 68 after predetermined movement for a purpose to appear.

The upper body casting is integrally formed with a central hollow column 87 that is internally threaded at 88 to rotatably receive an externally threaded annular ferrule 89, which is preferably a molded plastic ring. A coiled compression spring 91 of large enough diameter to clear post head 58 is compressed between ferrule 89 and diaphragm pan 59 to exert a downward pressure on the diaphragm in opposition to the outlet gas pressure in chamber 65, and the pressure of diaphragm loading spring 91 is adjustable by rotation of ferrule 89. Ferrule 89 is usually a molded plastic ring and has imbedded therein the ends of a U-shaped bar 92 which is formed with a screw driver or like depression 93. The upper edge of ferrule 89 is also formed with tool receiving diametrically opposed recesses 94.

A diametral rod 95 has its ends mounted as by press fit in bores 96 in ring 89, and this rod provides a pivot for two light sheet metal vanes 97 of a butterfly type valve. Each vane is almost semi-circular and has an edge on its diameter curled about pivot rod 96 to form a hinge 98. These hinges are interrupted at the center for mounting a coiled torsion spring 99 on rod 96, and this spring has oppositely extending arms 101 lightly bearing on the upper sides of the vanes urging them into vent valve closed position upon annular ledge or valve seat 102 of ring 89.

At the upper end of column 87 is mounted an annular cap 103 threaded onto the column with a seal gasket 104 therebetween. When vent of gas to the surrounding space is permissible the opening 105 of cap 103 is merely covered with a filter 106 that prevents dust from entering the regulator but maintains chamber 66 at atmospheric pressure and serves as a vent outlet when the relief valve is open. Where the gas is undesirable or dangerous, filter 106 is omitted and opening 105 is a threaded bore to receive a pipe fitting to an exhaust conduit. A suitable seal 107 is provided between cap 103 and the body which must be broken to gain access to the interior of the column 87 for regulator adjustment, and this prevents unauthorized tampering with the regulator.

*Operation*

In normal operation the housing 13 is connected into a pipe line between a source of gas under pressure and the appliance or other apparatus where steady gas pressure is desired. The main valve controls flow of gas through the bore 19 and reciprocation of valve stem 26 to open or close the valve is controlled by diaphragm 51 which is moved by any differential in the forces exerted by the outlet gas pressure in chamber 65 on the one hand and compressed spring 91 on the other hand. The force exerted by spring 91 can be adjusted to suit a range of outlet gas pressures by adjustment of ring 89. The length of guide and bearing sleeve 31 is selected to insure straight line reciprocation of valve stem 26 and therefore proper seating of the main valve.

During normal operation diaphragm 51 will reach an equilibrium position where the opposed forces spring 91 and chamber 65 are effectively balanced to maintain the main valve open the right amount to permit such passage of gas as will result in the desired outlet pressure. When the outlet pressure rises the increase will be effective on the diaphragm to rock bell crank 69 clockwise and tend to close the main valve to reduce gas flow therethrough and lower the outlet pressure, and as the outlet pressure reduces the diaphragm will drop to tend to open the main valve, thus until the equilibrium position is attained.

During the foregoing action which is normal pressure regulation, the relief valve 54 is tightly closed because spring 64 is strong enough to keep the inner edge of diaphragm 51 compressed between pan 59 and edge 55, and since edge 55 is sharp and the material of the diaphragm compressible this closure of diaphragm opening 53 is gas tight. Different effective closing forces for the relief valve may be selected by using collars 60 of different axial length with spring 64 or by using different strength springs at 64. The closed relief valve thus normally functions as a solid motion transmitting connection between diaphragm 51 and bell crank 69.

A condition may arise however where the outlet gas pressure communicated to chamber 65 is higher than desired even though the main valve has reached fully closed position. This may occur when a solid particle lodged between the valve seat 23 and head 24 prevents closing of the valve and permits excess pressure to build up downstream. This may also occur under surge conditions where momentary pressures may rise swiftly to higher values. Under such conditions the relief valve is opened to vent the pressure of chamber 65 through the diaphragm opening 53. This will take place because valve 54 will be stopped from vertical upward movement by the solid linkage to the closed main valve, and further upward movement of diaphragm 51 will separate the diaphragm from the valve seat 55 against the compression of spring 64 to permit escape of gas from chamber 65 through the diaphragm and the spaces between spokes 62 into chamber 66. The spoke arrangement at the center of the diaphragm assembly insures that gas may pass therethrough even if spring 64 becomes solid when collapsed to open the relief valve. The free slide pivot connection between valve stems 26 and 68 and bell crank lever 69 insures that there is no binding of the main valve actuating linkage in normal operation.

Opening of the relief valve prevents rupture of the diaphragm 51 and assures no damage due to excess pressure to the appliances in the outlet pipe line.

The invention provides a further safety feature for opening the relief valve when the linkage between the main valve and diaphragm is broken, as when arm 74 is disconnected from stem 26. Should the outlet gas pressure become excessive when that happens the diaphragm would be ineffective to close the main valve, and by the same token there would be no separation of valve seat 55 from the diaphragm, and the increased pressure could rupture the diaphragm. However, see FIGURE 3 especially after a certain predetermined rise of relief valve 64, its enlarged lower end engages stops 86 and further diaphragm upward movement opens the relief valve.

The normally closed valve on ring 89 provides venting of the gases from chamber 66 from the regulator. This central location of the vent valve coaxially of the relief valve provides a particularly efficient and direct venting arrangement not hitherto known which improves the overall regulator response. The light weight of loosely pivoted valve vanes 97 and the weak torsion spring at 99 are such as to vent chamber 66 quickly and prevent any build-up of pressure therein, and the valve is normally closed to prevent ingress of dust or dirt. The loosely pivoted vanes 97 permit breathing ingress or egress of air as the diaphragm moves with relief valve 64 closed, so that the motion of the diaphragm is free of pressure changes in chamber 66 and therefore non-fluttering. The valve containing vanes 97 opens temporarily when excess gas pressure exists in chamber 66. Bar 92 limits the upward opening movement of each vane 97.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas pressure regulator, a body having a passage therethrough and a movable main valve for controlling flow of gas through said passage, a fluid pressure responsive element movably mounted within said body, said pressure responsive element having a through opening and at least one side exposed to a first chamber within the body containing gas under pressure from said passage to be controlled by said main valve, motion transmitting linkage means operably connecting said element and said main valve, a second chamber being provided in the body on the other side of said element, a relief valve mounted to move with said pressure responsive element, said relief valve controlling fluid flow through said opening and being located in said first chamber, means normally urging said relief valve to close said opening, and coacting positive stop means on said relief valve and on said body and independent of said linkage means, said coacting positive stop means being located in said first chamber for opening said relief valve to vent gas pressure from said first chamber to said second chamber upon predetermined movement of said pressure responsive element in the direction which it is displaced by increasing gas pressures in said first chamber.

2. In the gas pressure regulator defined in claim 1, said coacting stop means comprising interengaging projections on the relief valve stem and rigid with said body respectively.

3. In a gas pressure regulator, a body having a passage therethrough and a movable main valve for controlling flow of gas through said passage, said body being separated into two chambers by a flexible diaphragm having one side exposed to gas pressure from said passage to be controlled by said main valve, motion transmitting linkage means connected between said diaphragm and said main valve, and a relief valve mounted on said diaphragm for controlling fluid flow through an opening formed through said diaphragm, means normally urging said relief valve to close said opening, said relief valve having a stem connected to said linkage means and projecting from said one side of the diaphragm, and coacting stop means on said stem and said body at said one side of said diaphragm independently of said linkage means for opening the relief valve upon predetermined displacement of said diaphragm in response to increased gas pressure at said one side.

4. In the gas pressure regulator defined in claim 3, said stem projecting into a well formed in the wall of said body and having a mouth opening into the chamber at said one side of the diaphragm, and said stop means comprising an enlarged portion of said stem disposed in said well and a rigid body part at the mouth of the well located between said enlarged stem portion and said diaphragm.

5. In a gas pressure regulator, a body having a passage therethrough and a movable main valve for controlling flow of gas through said passage, said body being separated into two chambers by a flexible diaphragm clamped at its outer periphery and having a central through opening, said diaphragm being exposed at one side to a gas pressure from said passage to be controlled, a relief valve mounted on said diaphragm for controlling flow of fluid through said opening and being openable with respect to said opening to allow fluid communication between said chambers when said gas pressure exceeds a predetermined magnitude, means providing a tubular body extension at the other side of said diaphragm, an axially adjustable spring abutment mounted in said extension, a compression spring extending through said body extension and abuttingly reacting between said spring abutment and the other side of said diaphragm opposite from said one side, and a vent valve for the chamber at said other side of said diaphragm and permitting continual ingress and egress breathing of air between the chamber at said other side of said diaphragm and the atmosphere surrounding said body when said relief valve is disposed to close said opening, said vent valve comprising valve closure vanes loosely mounted on said spring abutment substantially in central alignment with said relief valve, spring means normally biasing said valve closure vanes to closed positions against a seat on said spring abutment to prevent ingress of foreign particles into the chamber at the other side of said diaphragm, said valve closure vanes being openable against the bias of said spring means when the gas pressure in the chamber at said other side of the diaphragm exceeds a predetermined magnitude.

6. In a gas pressure regulator, a body, a flexible diaphragm within the body separating it into gas pressure and compression spring chambers, a relief valve mounted on the diaphragm and having a stem projecting into the gas pressure chamber, said body having a gas passage therethrough open to said gas pressure chamber, a main valve in said passage, a shiftable main valve stem projecting into said gas pressure chamber, a bell crank pivoted in said gas pressure chamber and having its arms in slide pivot connection with the respective valve stems, and coacting stop means on said relief valve stem and said body within said gas pressure chamber and independent of said bell crank for opening the relief valve upon predetermined displacement of said diaphragm in response to increased pressure in said gas pressure chamber.

7. In the gas pressure regulator defined in claim 6, said body being formed with a well open to said gas pressure chamber and said bell crank being disposed wholly within said well.

8. In the gas pressure regulator defined in claim 6, said body being formed with a well open to the gas pressure chamber and into which said relief valve stem extends, and said stop means comprising interengaging formations on the relief valve stem and the sides of said well.

9. In a gas pressure regulator, a body having a passage therethrough and a movable main valve for controlling flow of gas through said passage, a flexible diaphragm mounted in said body with one side exposed to a first chamber containing gas under pressure from said passage to be controlled by said main valve, passage means interconnecting said first chamber to a second chamber formed on the other side of said diaphragm, a relief valve controlling flow of gas through said passage means and mounted to move with said diaphragm, coacting means on said relief valve and said body for automatically opening said relief valve for permitting the discharge of gas through said passage means from said first chamber to said second chamber upon predetermined displacement of said diaphragm in the direction it is moved by increasing gas pressure in said first chamber, and a vent valve for said second chamber and having a pivotally mounted valve closure assembly spring biased to closed position into engagement with a seat rigid with said body to prevent ingress of foreign particles into said second chamber from the surrounding atmosphere, said valve closure assembly being pivotally displaceable to opened position off said seat to discharge gas from said second chamber only when a predetermined relatively high gas pressure is reached in said second chamber, said vent valve permitting continual ingress and egress breathing of air between said second chamber and the atmosphere around said body with said valve closure assembly in said closed position.

10. In the gas pressure regulator defined in claim 9, said valve closure assembly comprising a loosely pivoted flap extending over an opening leading to said second chamber, and a torsion spring of predetermined strength for holding the flap in closed relation to said opening.

11. In a gas pressure regulator, a body having a passage therethrough and a movable main valve for controlling flow of gas through said passage, a flexible pressure responsive element movably mounted within said body with one side exposed to a chamber within said body containing gas under pressure from said passage, a relief valve movably mounted on said diaphragm for opening and closing an opening through said diaphragm, motion transmitting linkage means connecting said main valve to said relief to enable conjoint movement of said main valve and said relief valve, and stop abutment means rigid with said body and being operable to open said relief valve upon predetermined displacement of said element in response only to increased pressure in the gas pressure chamber.

References Cited in the file of this patent
UNITED STATES PATENTS

| | | |
|---|---|---|
| 1,105,556 | Fouts | July 28, 1914 |
| 1,238,878 | Bravo | Sept. 4, 1917 |
| 1,413,371 | Adler | Apr. 18, 1922 |
| 1,897,572 | Cornell | Feb. 14, 1933 |
| 1,910,949 | Germeyer | May 23, 1933 |
| 2,183,569 | Hughes | Dec. 19, 1939 |
| 2,302,284 | Abbott | Nov. 17, 1942 |
| 2,306,746 | Niesemann | Dec. 29, 1942 |
| 2,634,088 | Niesemann | Apr. 7, 1953 |
| 2,664,674 | Niesemann | Jan. 5, 1954 |
| 2,731,026 | Hughes | Jan. 17, 1956 |
| 2,826,213 | Wright | Mar. 11, 1958 |
| 2,827,069 | Peterson | Mar. 18, 1958 |